FIG. I

INVENTOR.
FRANK B. SWEENEY
BY
Kane, Dalsimer and Kane

INVENTOR.
FRANK B. SWEENEY

INVENTOR.
FRANK B. SWEENEY

July 5, 1960   F. B. SWEENEY   2,943,337
FLASH TRIMMING MACHINE

Filed Jan. 8, 1958   13 Sheets-Sheet 11

INVENTOR.
FRANK B. SWEENEY
BY
Kane, Dalsimer and Kane

July 5, 1960
F. B. SWEENEY
2,943,337
FLASH TRIMMING MACHINE
Filed Jan. 8, 1958
13 Sheets-Sheet 12
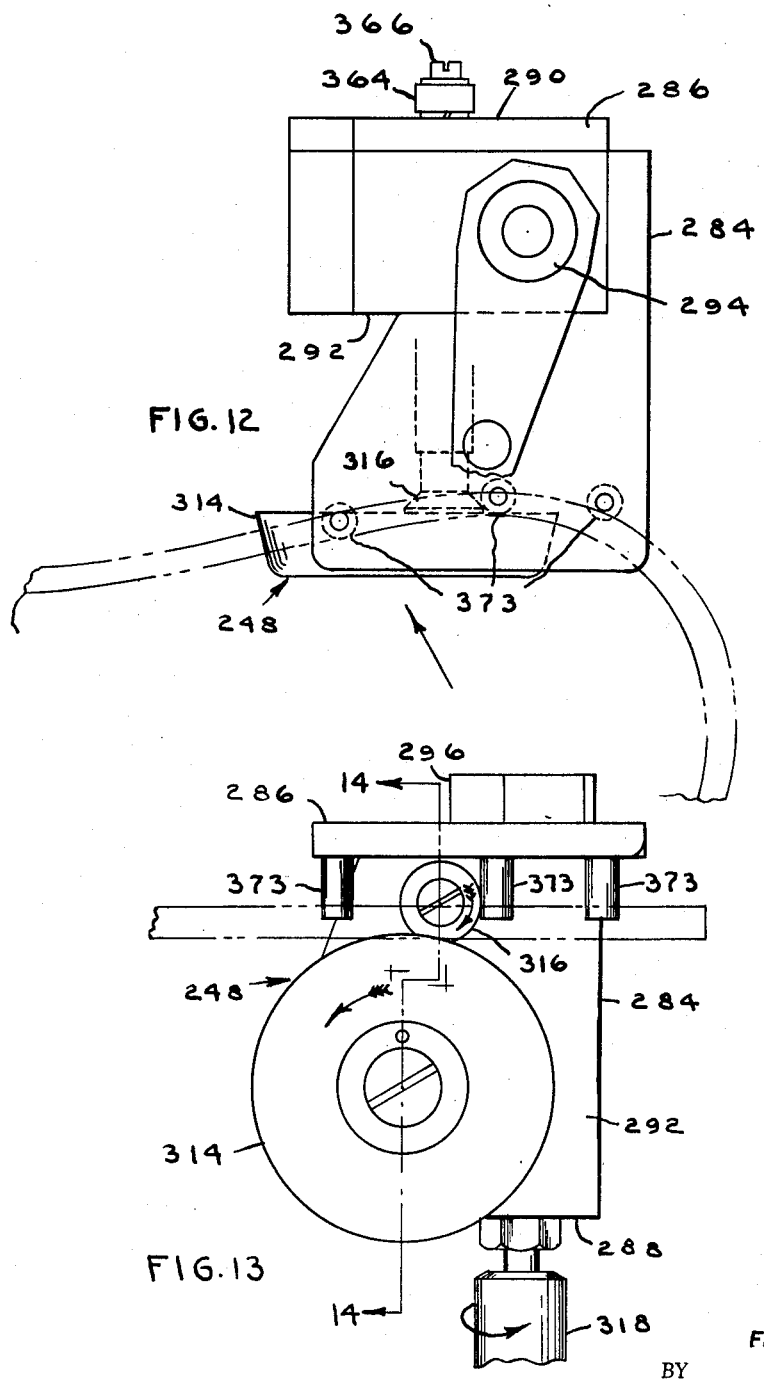
INVENTOR.
FRANK B. SWEENEY
BY
*Kane, Dalsimer and Kane*

July 5, 1960
F. B. SWEENEY
2,943,337
FLASH TRIMMING MACHINE
Filed Jan. 8, 1958
13 Sheets-Sheet 13
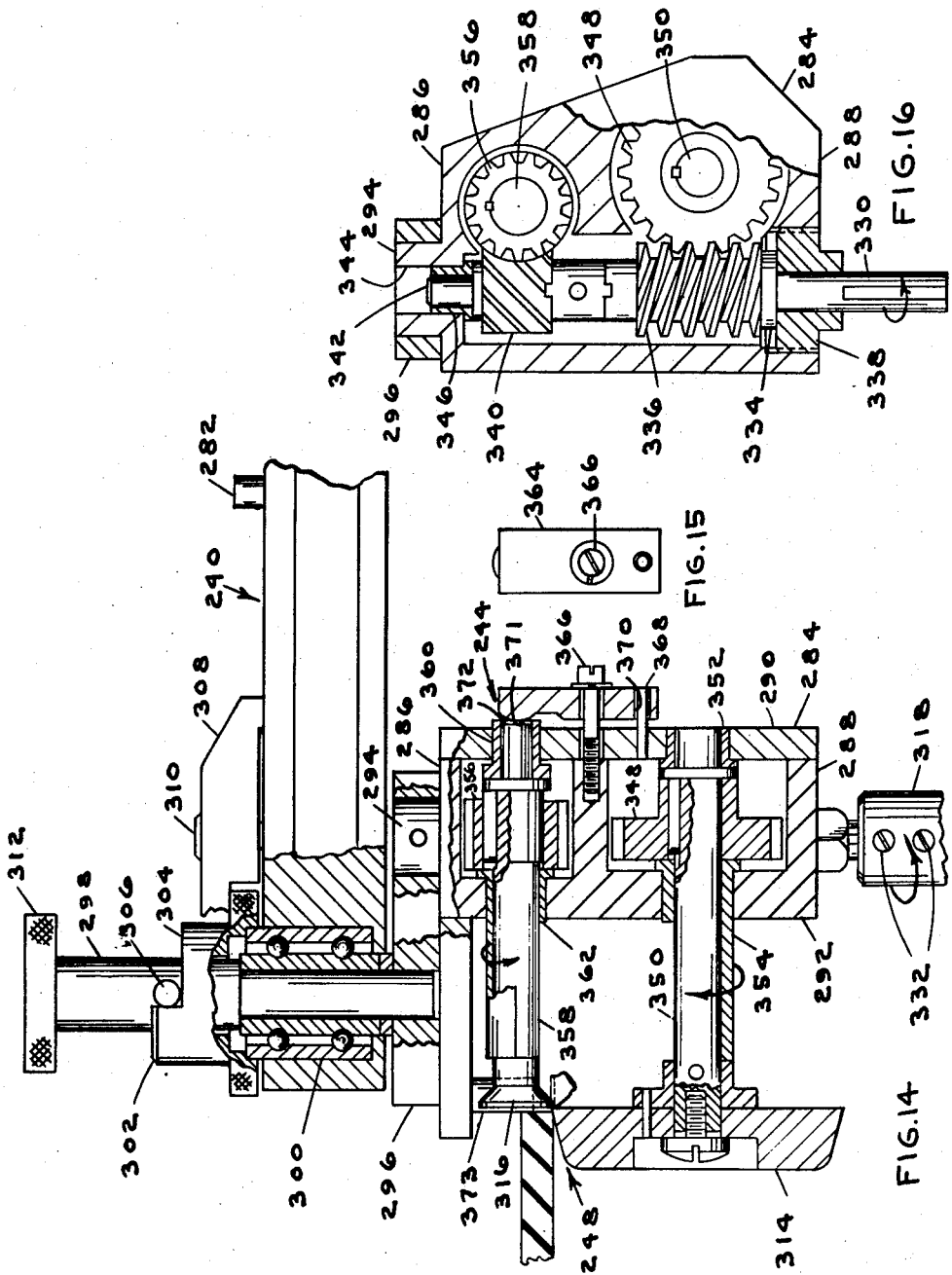
INVENTOR.
FRANK B. SWEENEY
BY
*Kane, Dalsimer and Kane*

United States Patent Office 2,943,337
Patented July 5, 1960

2,943,337

FLASH TRIMMING MACHINE

Frank B. Sweeney, Rochester, N.Y., assignor to Endicott Johnson Corporation, Endicott, N.Y., a corporation of New York Filed Jan. 8, 1958, Ser. No. 707,804

10 Claims. (Cl. 12—86.7)

This invention relates to a flash trimming machine, and more particularly to a machine and various assemblies thereof, as well as a method for trimming flashes on molded products such as molded rubber soles.

In the manufacture of many molded products such as rubber soles, a flash is normally formed, and in the case of molded rubber soles the flash extends from the base of the peripheral edges defining the toe, heel and sides. Many factors may contribute to this flash formation, but in any event, for a majority of purposes, the flashing is undesirable and must be removed. For example, when a molded rubber sole is subsequently subjected to various finishing operations, the flashes may result in malfunctioning or inefficient operation of finishing equipment. Naturally, for these reasons and many others, it is extremely desirable that the molded product be relieved of its flashes.

Accordingly, it is an object of this invention to provide an efficient, practical, inexpensive means and method for trimming flashes on molded articles such as molded rubber soles.

Another object is to provide an automatic flash trimming machine sensitive to the contours of a flashed article for relieving the article of flashes at the contours.

Still another object is the provision of an automatic hopper and feed assembly for positioning and maintaining a plurality of flashed articles in a predetermined arrangement and then ejecting one of said articles to a preset location while displacing another article which was originally at said preset location to a second location.

A further object is the provision of a cutter mechanism capable of a plurality of movements while being biased to respond to variations in contours of a flashed article and circumscribe the contours and remove flashes extending therefrom.

An important object is a method of trimming flashes from a flashed article by subjecting the article to multiple cutting operations which are conducive to mass flash removals.

In general, this invention employs an article sensitive cutter means responsive to contours of a flashed article to circumscribe these contours and remove flashes that may be extending therefrom. A multi-stage cutting technique for trimming these flashes is taught in which a plurality of the article sensitive cutter means perform a trimming function along selected contours of the flashed article. An automatic hopper and feed mechanism provides for the continuous preset presentation of flashed articles to the cutter means.

Other objects and advantages will become apparent from the following detailed description taken in connection with the accompanying drawings, in which:

Fig. 12 is a top view of a cutter head assembly mounting a rotatable cutter arrangement, with certain parts removed;

Fig. 13 is a side view of the cutter head assembly and cutter arrangement of Fig. 12, with certain parts broken away and removed;

Fig. 14 is a side view of a connection of the cutter head assembly taken along the line 14—14 of Fig. 13, and; including a mounted cutter arrangement with a power driven double universal and the cutter arm, with certain parts broken away and removed;

Fig. 15 is a front view of an adjustable plate for varying the surface contact of rotatable cutters in a cutter arrangement;

Fig. 16 is an end view of a part of a cutter head assembly, illustrating in section the connection between the power driven double universal and the cutter of the cutter arrangement, with certain parts broken away and removed.

Figure 1:
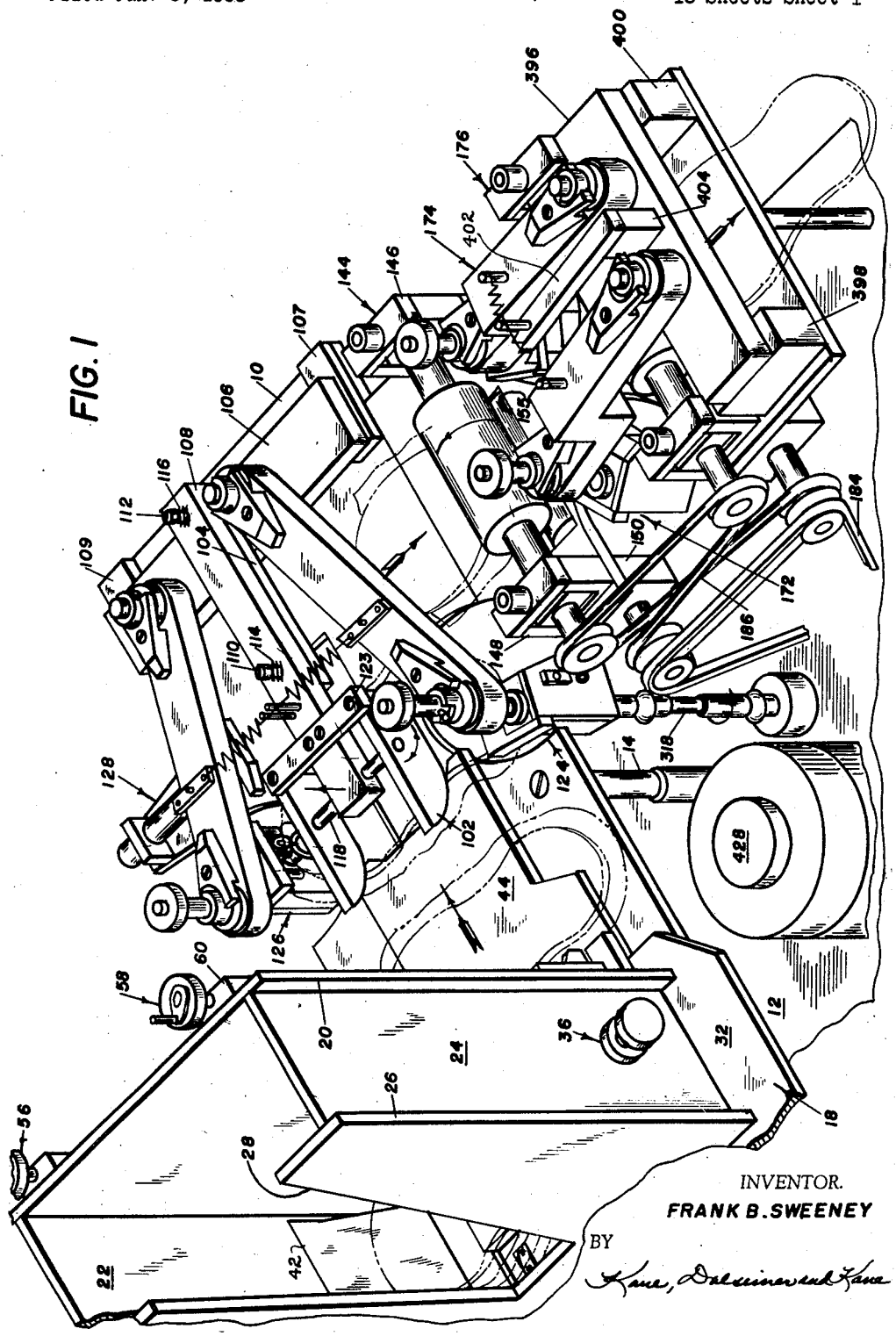
Fig. 1 is a perspective view of a sole trimming machine that incorporates the teachings of the present invention, with certain parts broken away and removed.
Figure 2:
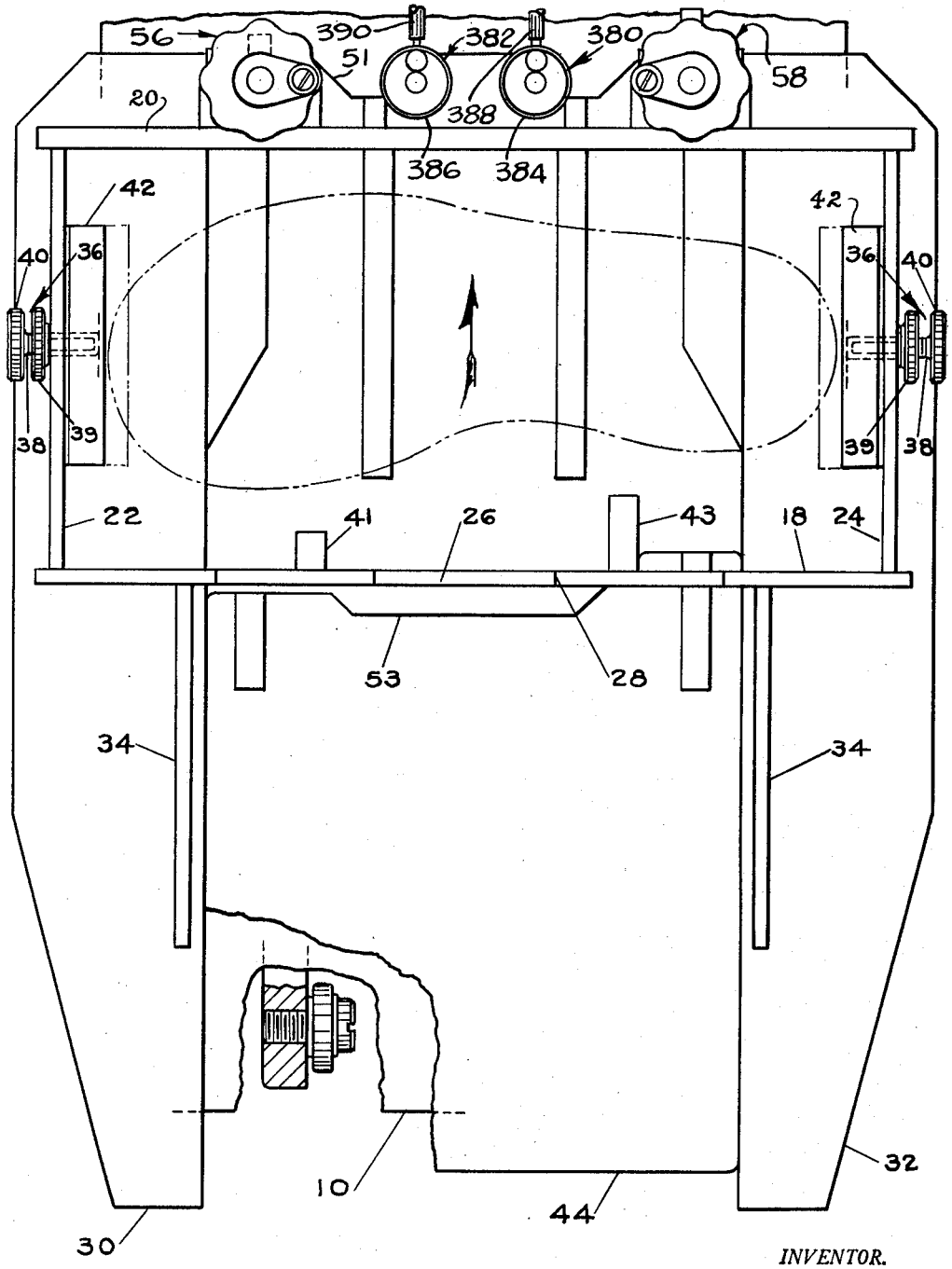
Fig. 2 is a plan view of the hopper and feed assembly on the top plate of the machine, with certain parts broken away and removed.

In the drawings a preferred embodiment of the invention is illustrated which comprises a support having a top plate 10 and a lower plate 12. Top plate 10 is spaced from and supported on lower plate 12 by a plurality of suitably spaced vertical posts 14. Lower plate 12 is supported above the normal floor level by any conventional structure such as a stand designated generally by numeral 16. The essential requirements of the support are that it provide two levels, both spaced above the floor, with suitable receiving surfaces for the various functional parts of the invention, and that it does not hinder in any way the desired operation of these parts.

Referring now to Figs. 1 to 5, a hopper and feed assembly is mounted on the upper surfaces of plate 10 and functions to stack and eject flashed articles which for a somewhat preferred application of this invention are flashed molded rubber soles. This assembly includes a hopper or magazine 18 which comprises a back panel 20, a pair of side panels 22 and 24, and a front panel 26. Front panel 26 may include a window 28 for conveniently observing the interior of hopper 18. Included in the hopper structure are a pair of spaced, elongated base plates 30 and 32. Braces 34 may be provided and suitably secured to front panel 26 and base plates 30 and 32 substantially as shown, to maintain the upright panels in a substantially vertical position with respect to the base plates. The hopper 18 is preferably loaded with the flashing of the rubber soles disposed along the base or the lower portion of the edges of the article.

To insure the desirable lengthwise positioning of the soles within hopper 18, sole size adjustment assemblies 36 may be provided on sides panels 22 and 24. The size adjustment assemblies can assume many forms in accomplishing the desired end, and as illustrated, may include a threaded shaft 38 having a knurled knob 40 at one end mated with an internally threaded member 39 which is secured to the mounting side panel to facilitate the adjustment of the assembly. A resilient and flexible flap 42 is secured at one end thereof to the internal face of side panels 22 and 24. The free end of flap 42 may then be swung outwardly or inwardly by so turning the threaded shaft 38 with respect to the mounting side panel. Thus the free end of flap 42 can be adjusted to accommodate a particular sole size, thereby insuring against any undesirable sideward movement or positioning of the stacked soles within hopper 18. Additionally, uprights 41 and 43 may be secured to the interior face of panel 26 to properly maintain a particular sized sole within hopper 18 especially during the feeding operation of the sole to the flash trimming mechanism as will become apparent shortly.

A reciprocal sole pusher 44 is disposed between the adjacent sides of base plates 30 and 32 and is adapted to move freely therebetween to accomplish the proper sole feeding from hopper 18. The reciprocal sole pusher 44 comprises an elongated lower plate 46. An upper plate 48 is mounted on the upper face of lower plate 46 and is suitably secured to the latter as by a series of properly located screws 50. When the pusher 44 is in a fully retracted position, as clearly illustrated in Figs. 2 and 3, the soles in hopper 18 rest upon the upper face of lower plate 46. Upper plate 48 is of reduced length and is disposed toward the front portion of lower plate 46 and is thereby in a position to abut against the lower sole in hopper 18 when pusher 44 is fully retracted. The front panel 26 is provided with an elongated slot 52 (Fig. 4) adjacent the bottom thereof to receive and permit movement therethrough of upper plate 48 of pusher 44.

Back plate 20 is provided with a substantially enlarged elongated slot 54 to permit movement therethrough of the pusher 44 with a mounted sole. Mounted on the exposed face of back plate 20 are a pair of hopper gating means 56 and 58 for insuring the feeding of a single sole from hopper 18 during one reciprocation of pusher 44 and additionally functions to prevent the discharged sole from returning with pusher 44 at the termination or retraction of a particular reciprocating cycle. Each hopper gate adjusting means may include a bracket 60 secured to surfaces of back plate 20. Movable with respect to bracket 60 by means of a threaded shaft 62 is a tapped elongated member 64. Housing 66 is additionally secured to back plate 20 substantially as shown. Movable within housing 66 is a gating member 68 which is provided with a slot 70 for receiving a protruding stop pin 72 extending from the interior surfaces of housing 66. A stop pin 74 extends from gating member 68 into slot 76 in member 64 and is biased in a downward path by means of spring 78.

Therefore it will be observed that by means of threaded shaft 62, member 64 may be raised or lowered to govern the effective opening of slot 54 and permit the discharge of only a single sole from within hopper 18 during one reciprocating stroke of pusher 44. Additionally by means of beveled face 80 and the bias of gating member 68, it is possible to permit the discharge of a sole from hopper 18 at the beginning of the reciprocating stroke of pusher 44, but prevent the return of a discharged sole on the top face of bottom plate 46 of pusher 44 when the latter terminates its reciprocating stroke. The full extent of a particular reciprocating stroke of pusher 44 will become apparent shortly. The rear ends 51 and 53 (Fig. 2) of bottom plate 46 and top plate 48 respectively of pusher 44 are preferably of a configuration which will permit the substantially longitudinal axis of a sole to be approximately normal to the axis of reciprocation of pusher 44 when a particular sole is forced to bear against either end.

To prevent pusher 44 from frictionally bearing against the upper surface of top plate 10, thereby providing an efficient pusher reciprocating action, are four substantially similar roller assemblies 82. Each roller assembly 82 may include a roller 84 mounted on shaft 86 extending from housing 88 which in turn is secured to the lower face of top plate 10.

Figure 3:
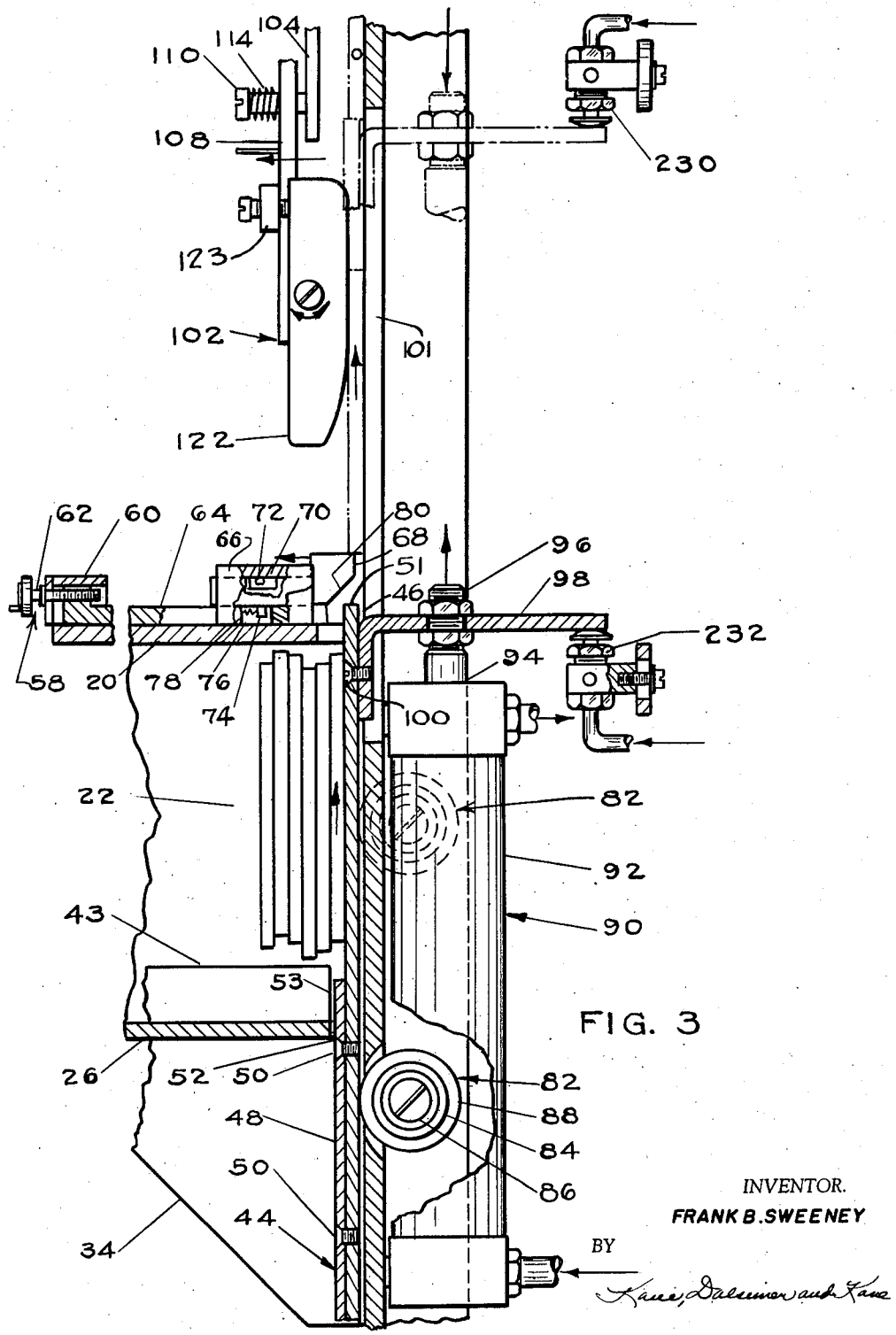
Fig. 3 is a longitudinal sectional view taken through the hopper and feed assembly of Fig. 2 to illustrate the various features thereof, and with certain parts broken away and removed.

Mounted on the under side of top plate 10 is the main pneumatic cylinder 90 which may be of conventional design and include a cylindrical air chamber 92 receiving a movable piston and piston rod assembly generally designated by numeral 94. The exposed end 96 of the piston rod is secured to a downwardly extending flange 98 which is secured to the under surface of bottom plate 46 of pusher 44 by conventional means, such as a plurality of screws 100. An elongated slot 101 is provided in top plate 10 of the machine support to permit the movement of the downwardly extending flange 98 during the reciprocal movements of pusher 44. Thus, when air chamber 92 is pressurized to extend the piston and piston rod assembly which is adapted to move flange 98, the entire reciprocal pusher 44 will move to ultimately produce the desired forward stroke of a particular pusher reciprocating movement. The phantom outline illustrated in Fig. 3 is the location of the end of the pusher forward stroke and the beginning of the retracted stroke. As is well known in the art, the piston and piston rod assembly is forced back into chamber 92 by alternating the pressure differential on the side faces of the displaceable piston.

On the initial forward stroke of pusher 44, a sole will be forced by end 53 of upper plate 48 through slot 54 and out of hopper 18. Upon retraction of pusher 44, the ejected sole will bear against the exposed rear face of gating member 68, thereby preventing the ejected sole from returning with bottom plate 46 of pusher 44 to the interior of hopper 18. During the next reciprocating cycle, top plate 48 will commence to eject another sole in a similar manner from hopper 18, but by this time the sole that was ejected during the previous reciprocation cycle will now come in contact with the adjacent end 51 of bottom plate 46 and be displaced through the first cutting stage of this invention.

Figure 6:
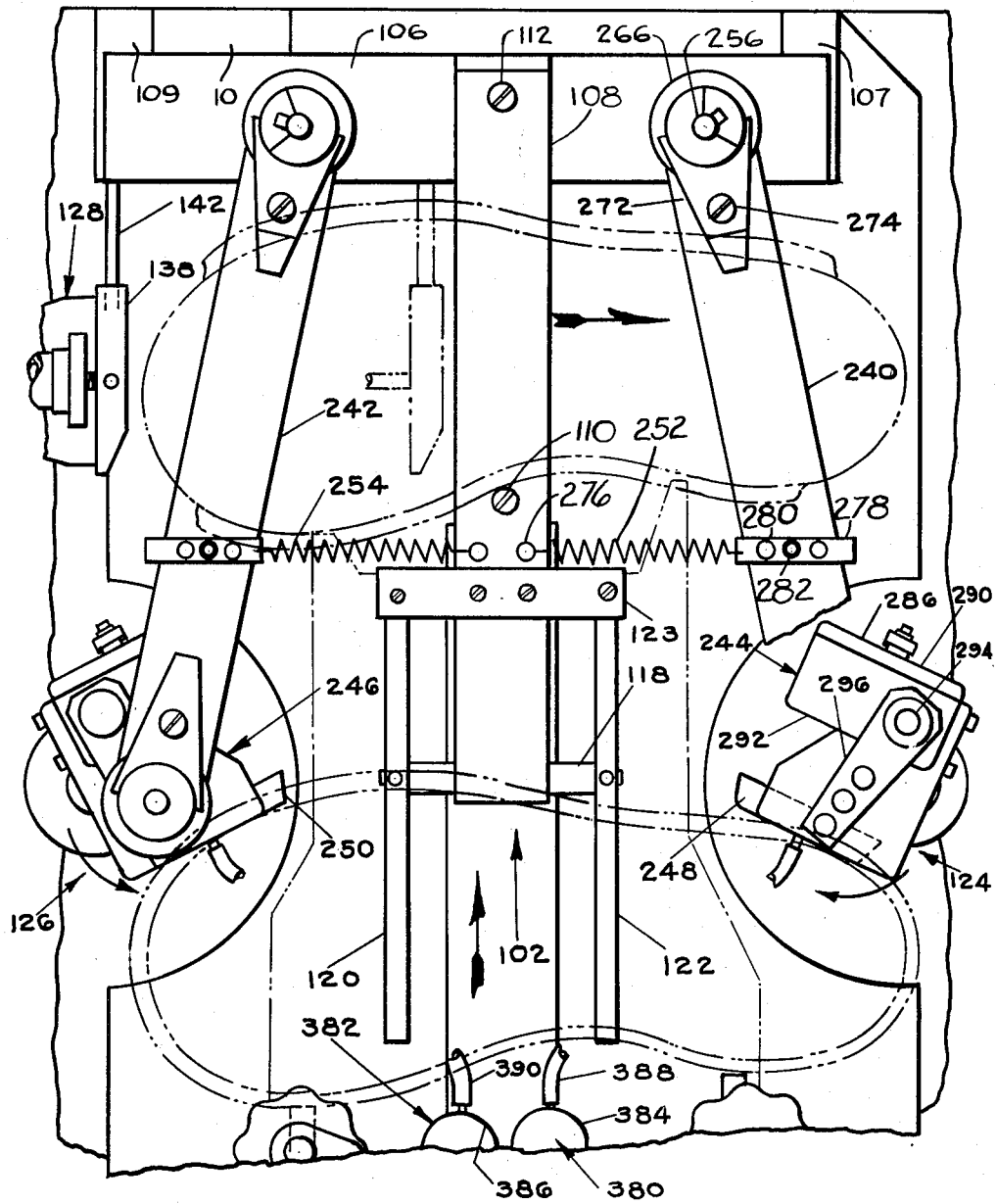
Fig. 6 is a plan view of the first cutting stage of the present invention.

Referring now to Figs. 1, 3 and 6, it will be observed that at the commencement of the first cutting stage, bottom plate 46 of pusher 44 will drive an ejected sole on top plate 10 of the machine support into contact with a hold-down device 102. Hold-down device 102 comprises an elongated bar 104 mounted on a transversely extending elongated plate 106 which is secured to bearing plates 107 and 109 fixed to top plate 10. A second elongated bar 108 is positioned on bar 104 and is spring-biased with respect to the latter by means of posts 110 and 112 secured to bar 104, and by means of springs 114 and 116 surrounding the respective posts. Thus, the functional parts of hold-down device 102 will be afforded some degree of resiliency in a vertical direction.

A shaft 118 extends through plate 108 along an axis substantially normal to the longitudinal axis of plate 108 and normal to the axis of reciprocation of pusher 44. On the terminal ends of shaft 118 are rotatable or rockable side members 120 and 122 which present arcuate side faces for initially contacting the flashed sole as it is being displaced by lower plate 46 of pusher 44. A rotation regulator 123 is attached to plate 108 and functions to adjust the permissible rotation of side members 120 and 122 through a pair of threaded members which can be adjusted in their contact relationship with the upper edges of the side members. An effective substantially resilient device is thus provided to receive and suitably hold down the sole in proper alignment during the first cutting stage while not hindering the operation of pusher 44.

As a sole is pushed by bottom plate 46 of pusher 44 under side members 120 and 122 of hold-down device 102, the peripheral edge portions of the sole and the flashes extending therefrom will ultimately engage cutter assemblies 124 and 126. These cutter assemblies, including their specific structural elements with the various functions thereof, will be described in detail shortly. It will be sufficient to state at this point that assemblies 124 and 126 are constructed and arranged in such a manner that they will selectively circumscribe the contours of the heel and toe portions respectively of the sole to remove the flashes extending therefrom as the pusher 44 urges a sole through the first cutting stage. At the termination of the forward stroke of pusher 44, the desired function of the first stage cutter assemblies 124 and 126 will have been accomplished and the sole with the partially removed flashing will now be at a location at which it can be exposed to the second cutting stage.

Figure 7:
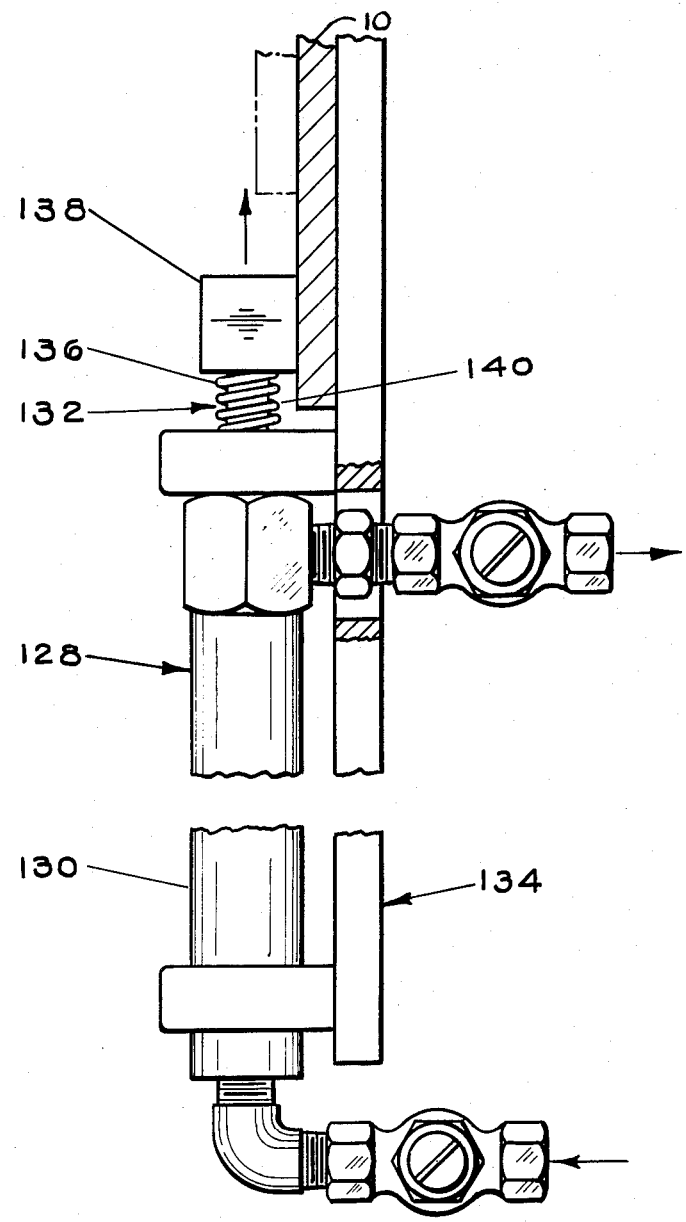
Fig. 7 is a side view of the sole pusher assembly disposed along the axis of the second cutting stage, with certain parts broken away and removed.

Referring now to Figs. 1, 6 and 7, it will be seen that the sole is displaceable by a second pneumatic pusher assembly 128. Pusher assembly 128 may be of conventional design and include the usual air cylinder or chamber 130 which receives a piston and piston rod assembly 132. The cylinder or air chamber 130 is suitably mounted on a support, designated generally by numeral 134, which is secured to the under face of top plate 10 of the machine support. The terminal end 136 of the piston rod is fixed to a pusher block 138 which is biased towards the air cylinder 130 by spring 140. A rod 142 extends transversely from block 138, and the free end thereof bears against the inner side of plate 106 to insure the correct alignment of the block with the principal axis of the second cutting stage and the intended axis of reciprocation of the pneumatic pusher assembly 128. As will be described more fully later, the forward stroke of pusher assembly 128 commences at the inception of the retraction stroke of the main pneumatic cylinder 90 of the first cutting stage. Therefore, block 138 will engage the toe portion of the sole with the partially removed flashing and force it towards the cutting mechanisms of the second cutting stage. The displacement of the block 138 is of such a nature that the heel portion of the sole will be forced between feed rolls of the second cutting stage. The pusher block 138 will then retract because of the change in the air pressure differential on the faces of the piston in chamber 130 and additionally by the influence of spring 140.

Figure 8:
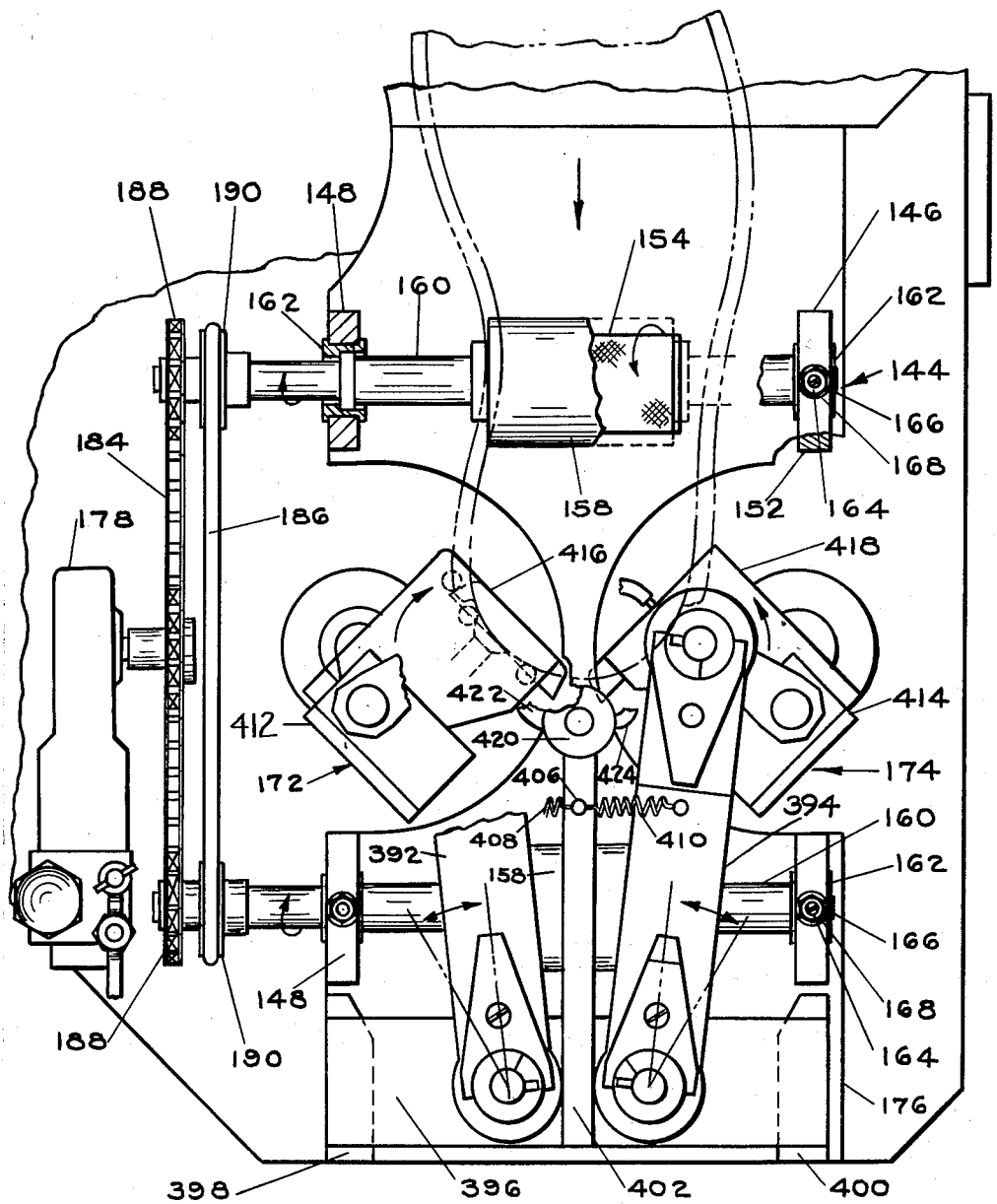
Fig. 8 is a plan view of the second cutting stage of the present invention.
Figure 9:
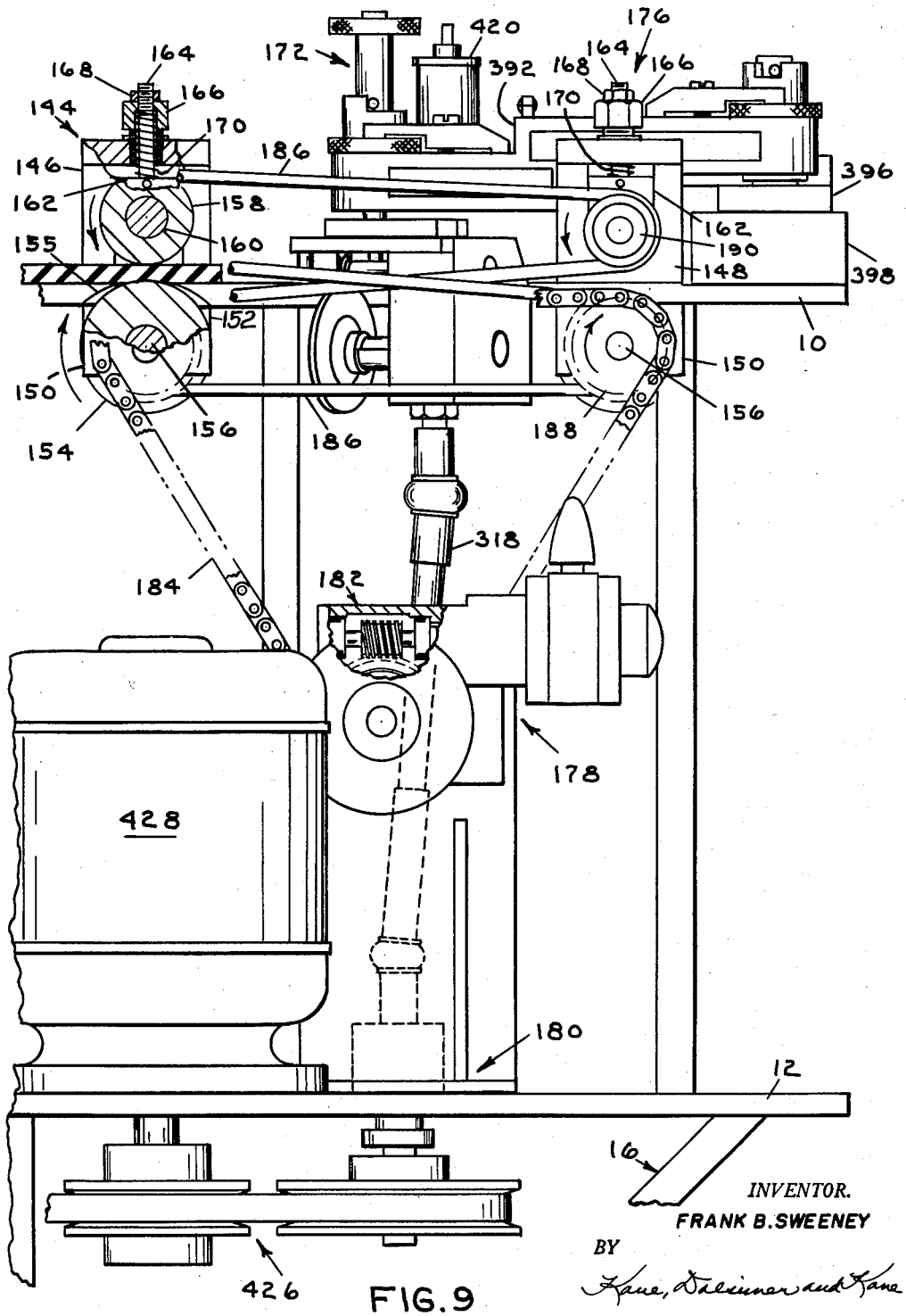
Fig. 9 is an elevational view of a front portion of a sole trimming machine illustrating the second cutting stage and viewed substantially normal to the axis of this stage, with certain parts broken away and removed.

In Figs. 1, 8 and 9, it will be observed that the displaced sole is now engaged by the rolls of the feed roll assembly 144 which is cooperable to drive the sole through the second cutting stage during which the remaining flashes are removed. Feed roll assembly 144 includes roller shaft supporting brackets 146, 148, 150 and 152. A lower roll 154 is mounted on a shaft 156 which is suitably journaled for rotation in its mounting brackets 150 and 152. The lower roll 154 presents a knurled or other similarly roughened surface finish to provide a gripping action for surfaces of a sole that it may encounter. This roll 154 is disposed in an opening 155 (Fig. 9) in top plate 10 with upper surfaces thereof sufficiently exposed over the upper surface of plate 10 in order that contact may be obtained with bottom surfaces of a sole displaced by pusher block 138.

In addition feed roll assembly 144 comprises an upper roll 158 which may present a smooth outer surface. Roller 158 is mounted on shaft 160 which is suitably journaled for rotation on displaceable blocks 162 in brackets 146 and 148. Blocks 162 are displaceable in a vertical direction for purposes of controlling the distance between upper roll 158 in relation to the lower roll 154. In this connection, a shaft 164 is connected at one end to block 162 and at the other end presents a threaded portion which extends beyond the upper face of the mounting bracket. An internally threaded sleeve 166 is threadedly mounted on the mounting bracket substantially as shown in Fig. 9. A nut 168 is threaded on shaft 164 to abut against the upper end of sleeve 166. Thus, by simply turning nut 168, block 162 may be raised or lowered, and consequently upper roll 158, with respect to lower roll 154.

An adjustable spring pressure is provided for governing the amount of surface contact between the rolls 154 and 158 to obtain proper feeding of a sole through the second cutting stage. Accordingly, a spring 170 is mounted on shaft 164 to exert its spring forces against block 162 and sleeve 166. The bias of spring 170 is obviously adjustable by either turning nut 168 or sleeve 166.

Rolls 154 and 158 are power driven at a preset speed to engage and drive a sole, displaced by pusher block 138, between the cutter assemblies 172 and 174. Cutter assemblies 172 and 174 are substantially identical to cutter assemblies 124 and 126 of the first cutting stage but selectively traverse the side contours of the sole to remove the flashes extending therefrom. The structural features of the cutter assemblies of this invention will become apparent from the detailed description thereof which is to follow.

Before the flash cutting of the second cutting stage is completed, the heel portion of the sole will contact a second feed roll assembly 176. This feed roll assembly 176 is substantially identical with feed roll assembly 144; and for the sake of brevity in disclosing the instant invention, a description of the structure of the feed roll assembly will not be repeated but like elements will be given identical numbers. It will suffice to say that feed roll assembly 176 engages and carries the sole through the remaining cutting operation of the second cutting stage and finally discharges the completely trimmed sole.

As aforementioned, the rolls of feed roll assemblies 144 and 176 are power driven. In this regard, an air motor 178 of conventional design is suitably mounted on lower plate 12 of the machine support by a bracket arrangement designated generally at 180. A conventional reduction gear arrangement 182 is disposed to drive the shafts 156 of the lower knurled rollers 154 through a chain and sprocket arrangement 184. The shafts 160 of the smooth upper feed rollers 158 are driven by a round belt 186. Drive pulleys 188 are suitably mounted on the shafts 156 of the knurled rollers 154 with the driven pulleys 190 mounted on the shafts 160 of the upper rollers 158. The speed of the feed rolls is infinitely variable through the control of the speed of the air motor 178. Obviously, the speed of motor 178 will be selected in accordance with the desired reciprocation of pusher assemblies 44 and 128.

Figure 10:
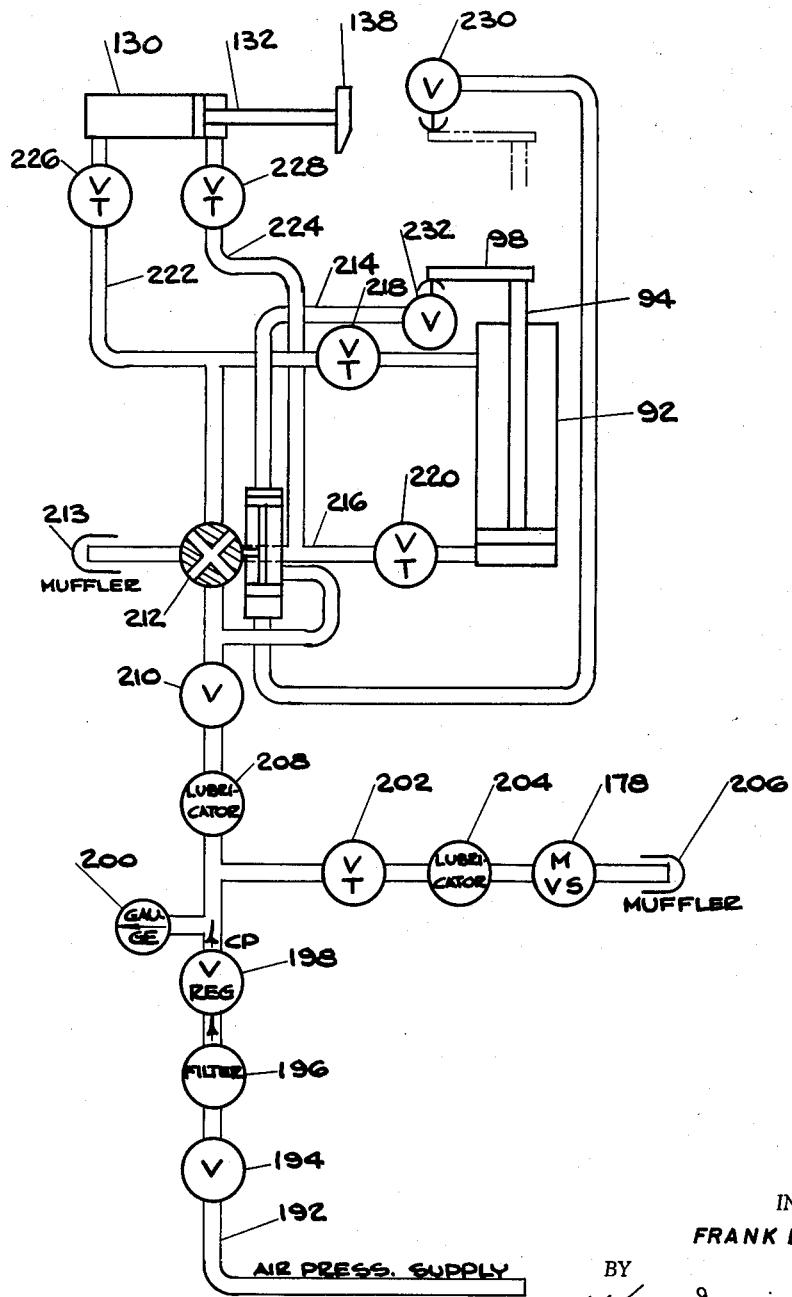
Fig. 10 is a schematic view of a pneumatic circuit that may be employed to accomplish the desired feeding of a flashed sole through the various cutting stages.

In Fig. 10, a possible pneumatic circuit of this invention is schematically illustrated and is adapted to drive the pusher assembly 44 of the first cutting stage, and the pusher assembly 128 and feed roll assemblies 144 and 176 of the second cutting stage. An air supply line 192 is coupled to a suitable source of air pressure (not shown) and is controlled by the usual air-main shut-off valve 194. A conventional air-filter 196 and airflow regulator 198 may be interposed in the air supply line 192 together with an air pressure gauge 200.

The main supply line 192 is tapped to supply the necessary pneumatic pressure to the air motor 178. An air motor speed control valve and shut-off 202 is provided for controlling the operation and speed of the air motor 178. Motor lubricator 204, as well as muffler 206 for the motor exhaust, may be appropriately disposed substantially as shown to accomplish their obvious respective functions.

The main supply line 192 further includes a lubricator 208 and first stage shut-off valve 210 at a location with respect to the air motor tap-off substantially as shown. An air pilot operated 2-position 4-way valve 212 is then incorporated in the supply line and may communicate with a muffler 213. The main air cylinder 92 and the second stage cylinder 130 are connected to the air supply line 192 through 4-way valve 212. In this regard, lines 214 and 216 communicate with cylinder 92, in such a manner as to be adapted to supply pressurized air to chamber 92 to act on either of the opposed faces of the piston and piston rod assembly 94. Variable flow controls 218 and 220 are interposed in lines 214 and 216 as illustrated. Lines 222 and 224 supply pressurized air to opposed faces of the piston of piston and rod assembly 132 in cylinder 130, and similarly includes variable flow controls 226 and 228 respectively.

Poppet pilot valves 230 and 232 are provided and are adapted to be activated by flange 98 which is attached to the piston and piston rod assembly 94 to displace 4-way valve 212 with respect to air supply line 192 and cylinders 92 and 130.

In operating the pneumatic circuit illustrated in Fig. 10, the air-main shut-off 194 is initially opened. The air motor 178 is then started and permitted to obtain the desired speed. After air motor 178 has attained the desired running speed, the first stage shut-off 210 is opened. With the 4-way valve 212 in a suitable first position, cylinder 92 is energized by air pressure through line 216. Accordingly, piston and piston rod assembly 94 will move through its forward stroke so that attached flange 94 will be displaced to the position shown in phantom. Simultaneously with the forward stroke of piston and piston rod assembly 94, air pressure will be transmitted through line 224 to retract piston and piston rod assembly 132 in cylinder 130. The entrapped air in the forward part of cylinder 92 and rear part of cylinder 130 will be permitted to pass through lines 214 and 222 respectively, the 4-way valve 212 and out the exhaust line mounting muffler 213. Thusly, a sole is fed from hopper 18 and positioned immediately forward of the first stage cutters 124 and 126.

At the termination of the forward stroke of piston and piston rod assembly 94, flange 98 will trip poppet pilot valve 230 which is cooperable to automatically move 4-way valve 212 to a second position. Pressurized air will then pass through lines 214 and 222. The piston and piston rod assemblies 94 and 132 will now retract and move forward, respectively. Entrapped air within the rear portion of cylinders 92 and forward portion of cylinder 130 will pass through lines 216 and 224 respectively, through 4-way valve 212 and then through muffler 213. Flange 98 will activate poppet pilot valve 232 at the termination of the retraction stroke of piston and piston rod assembly 94, thereby moving 4-way valve 212 to the first position to initiate the forward displacement of flange 98 and rearward displacement of pusher block 138. The pneumatic cycle is continuous with soles being fed from hopper 18 and displaced through the first cutting stage during the forward stroke of piston and piston rod assembly 94 and with pusher block 138 kicking a partly-trimmed sole into the feed roll assemblies of the second cutting stage on the forward stroke of piston and piston rod assembly 132. Obviously, the various flow controls can be adjusted to obtain proper and desired circuit functioning.

Referring now to the drawings illustrating cutter assemblies 124 and 126 of the first cutting stage, with particular reference to Figs. 1 and 6, it will be observed and as aforementioned, that flashes extending from the toe and heel portions of a sole are initially severed. Cutter assemblies 124 and 126, in general, are comprised of cutter arms 240 and 242, respectively, pivotally mounted on stationary elongated plate 106. Swivelly mounted on the free ends of cutter arms 240 and 242 are cutter heads 244 and 246, respectively. Cutter heads 244 and 246 support power driven rotatable cutter arrangements designated generally at 248 and 250, respectively. As a sole is driven by reciprocal pusher 44 between cutter assemblies 124 and 126, the faces of cutter elements 248 and 250 will engage surfaces of the heel and toe portion, respectively, of the driven sole. Cutter arms 240 and 242 will be swung outwardly against the bias of springs 252 and 254, respectively, as the forward stroke of reciprocating pusher 44 continues. As will be described shortly, a torque is created as a result of the cutting elements of the respective cutters being in firm contact with one another, thereby providing sufficient force for preventing the cutter heads from rotating away from the sole. In view of the various torques developed in the respective cutter assemblies, the cutters thereof will follow the varying selected contours of a sole as it is driven therebetween.

Figure 11:
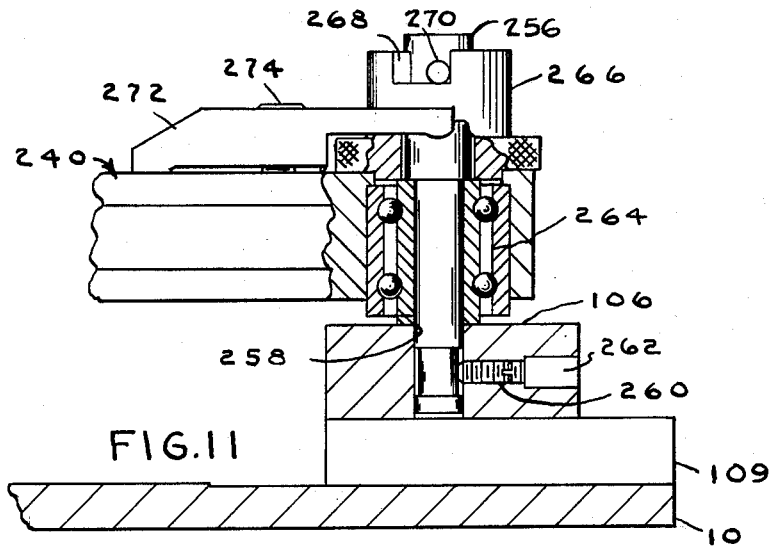
Fig. 11 is a side view of the pivotal connection between a cutter arm and a support therefor, with certain parts broken away and removed.

Cutter assembly 124 will now be described in detail. In Fig. 11, details of the pivotal mounting of cutter arm 240 with plate 106 are illustrated. As shown, a shaft 256 is adjustably disposed in bore 258 in plate 106. A threaded member 260 is threaded in a complementary tapped bore 262 to immovably secure shaft 256 to plate 106 after the desired orientation of these parts with respect to one another is selected. Cutter arm 240 is rotatably coupled with shaft 256 by means of ball bearings 264 substantially as shown. A stop collar 266 is disposed around the upper end of shaft 256 so that a slot 268 formed therein will receive a stop pin 270 extending from shaft 256. Stop collar 266 is secured to the mounting structure by a bifurcated clamp 272 secured to cutter arm 240 by means of screw 274. It will be apparent that the relative movement of cutter arm 240 with respect to plate 106 is limited by the relative positioning of pin 270 with respect to slot 268. Consequently, depending on the particular sole size, a suitable radial length of slot 268 is selected; and this slot is oriented with respect to pin 270 to provide a rotational movement to cutter arm 240 that will permit the severing of the selected portions of flashes on a sole driven through the first cutting stage. Thus the pivotal movement towards bar 108 because of the influence of spring 252 will be limited, as well as the rotation in an outwardly direction as a result of forces exerted by a sole driven through the first cutting stage.

Referring now to Figs. 1 and 6, spring 252 may be secured at one end to a post 276 mounted on bar 108. The other end of spring 252 is attached to a plate 278 having a plurality of apertures 280 formed therethrough. A rod 282 extends from the upper face of cutter arm 240 and is adapted to be inserted in any one of the apertures 280. Consequently, by selecting the proper aperture, a desired bias of spring 252 is obtainable.

As mentioned above, cutter head 244 is swivelly connected to the other end of cutter arm 240. With particular reference to Figs. 1, 6, 12, 13, 14, 15 and 16, cutter head 244 is provided with a housing 284. Housing 284 includes a top 286, a bottom 288 and opposed sides 290 and 292. On the upper face of top 286 of housing 284 a cylindrical extension 294 is eccentrically located. Immovably mounted at one end on extension 294 and in facial contact with the upper surfaces of top 286 is a relatively short arm 296. Adjacent the other end of arm 296 a shaft 298 is similarly immovably mounted. Shaft 298 is rotatably coupled with the free end of cutter arm 240 by means of anti-frictional bearings 300. A stop collar 302 is disposed around shaft 298 substantially as illustrated, and is provided with a radial slot 304. Slot 304 is suitably oriented with respect to surfaces of shaft 298 in order to receive therein a stop pin 306 protruding from the side of shaft 298. A clamp 308 is secured to cutter arm 240 by means of screw 310 to affix collar 302 relative to cutter arm 240 and to lock the collar at a predetermined orientation so that a desired displacement of pin 306 within slot 304 is attainable. A knurled hand knob 312 may be secured to the extreme upper end of shaft 298 for the purpose of sensing torque when adjusting knife tension, the purpose and nature of which will become apparent from the description that follows. A structure is accordingly provided in which it is possible to attain an adjustable and limited rotation of cutter head 248 with respect to cutter arm 240 by the proper selection of the radial length of slot 304 and its orientation with stop pin 306.

Figure 4:
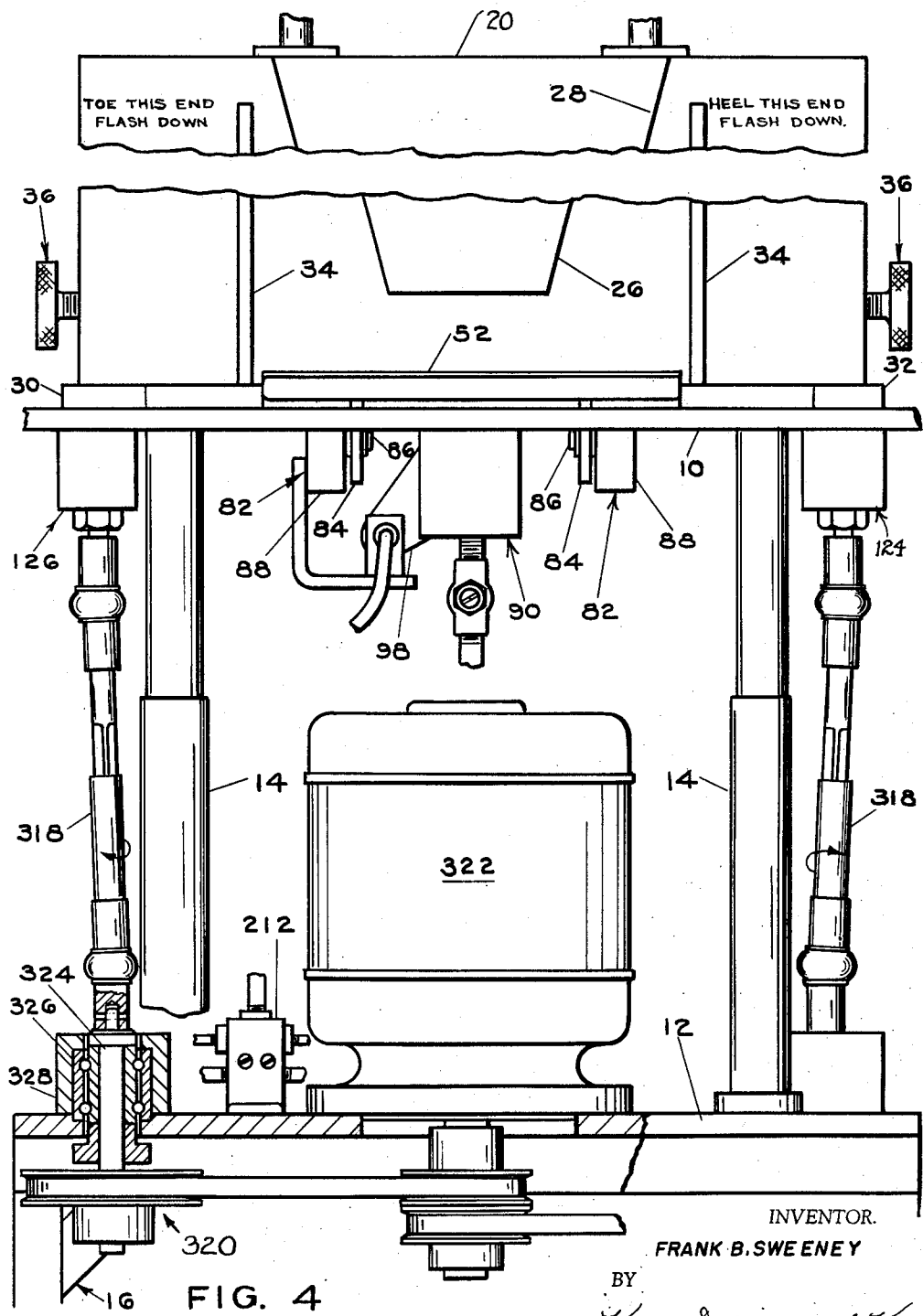
Fig. 4 is an elevational view of a part of the front of the sole trimming machine viewed substantially along the axis of the first cutting stage, with certain parts broken away and removed.
Figure 5:
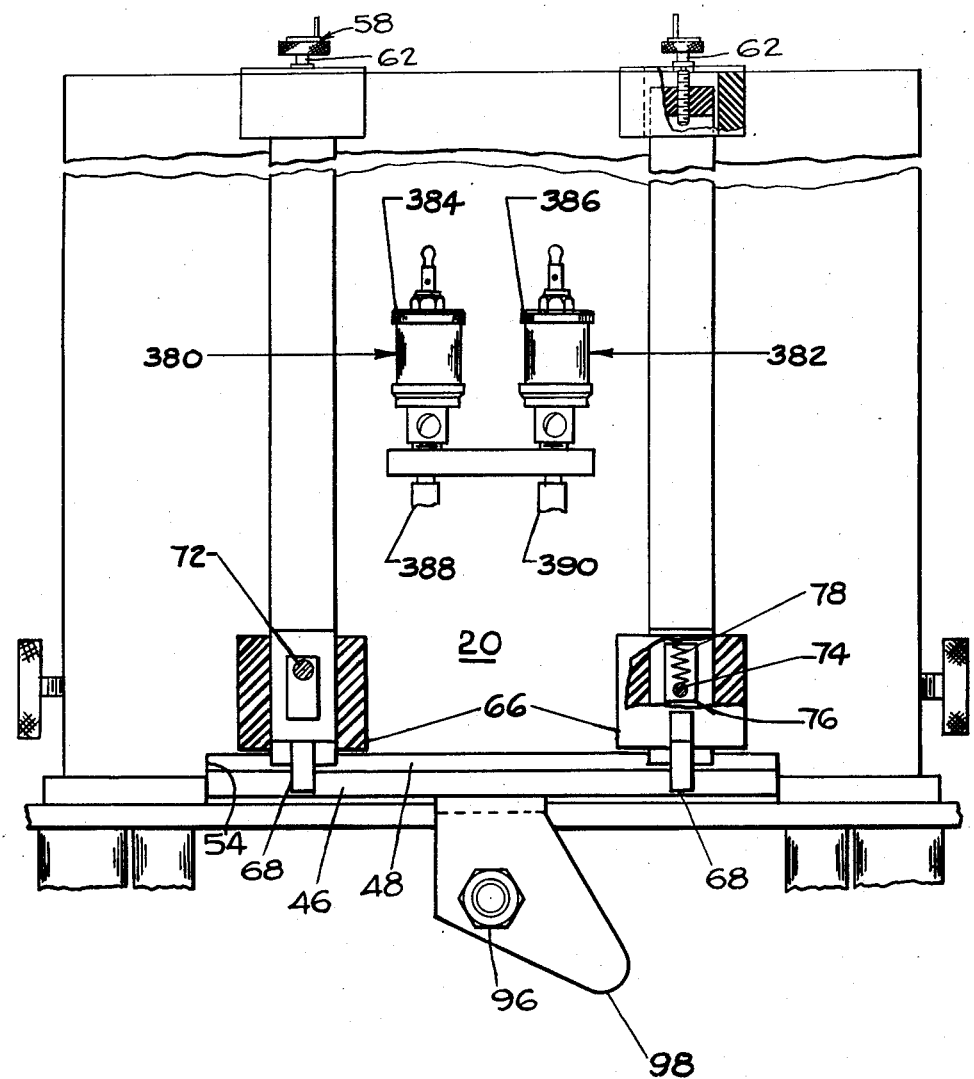
Fig. 5 is a rear view of the hopper and feed assembly mounted on the top plate of the machine support, with certain parts broken away and removed.

Flash cutter arrangement 248 includes a relatively large circular knife cutter 314 and a relatively small cutter 316, which are in facial contact with one another. Cutters 314 and 316 are rotated through a series of gears by means of one of four rotatably driven double universals 318 with axially free extended square inserts that are motor driven by means of V-belts and pulleys. In this connection, the double universal 318, which is of conventional design, is driven through a system of pulleys and belts designated generally at 320 by motor 322 suitably mounted on the lower plate 12 of the machine support (Fig. 4). The design of a double universal, as will be appreciated by those skilled in the art, permits the universal shaft and consequently the universal axis to flex or displace without disrupting the driving connections and couplings.

An example of a typical connection for a double universal with a motor is illustrated in Fig. 4, wherein a partial sectional illustration is present of a connection of the double universal, coupled with cutter arrangement 250 of cutter assembly 126, with motor 322. As shown, the lower end of the universal may be rotatably coupled with a shaft 324 rotatably mounted by bearings 326 in casing 328 which is mounted on lower plate 12 of the machine support. Shaft 324 is then properly coupled with the pulley and belt system 320 which is driven by motor 322 to obtain the desired direction of rotation.

Referring specifically to Figs. 14 and 16, the upper end of double universal 318 is fixedly coupled to grooved shaft 330 by means of screws 332. Shaft 330 is formed integrally with flange 334, from which extends a coaxially formed worm gear 336 rotatably disposed within housing 284. A bored plug 338 may be provided to bear against flange 334 and journal shaft 330 for maintaining worm gear 336 properly within housing 284. Keyed for rotation with worm gear 336 is helical gear 340. Helical gear 340 presents a shaft 342 which extends into bore 344 in housing 284 and is rotatable within this bore by means of bushing 346.

Suitably meshed to worm gear 336 and within housing 284 is gear 348. Gear 348 is mounted on and keyed with shaft 350. Shaft 350 is journaled in sides 290 and 292 by means of immovable bushing 352 and immovable waste stripper and shaft support 354. An end of shaft 350 together with a portion of shaft support 354 extends beyond the exterior face of side 292. The terminal end of the exposed portion of shaft 350 is then secured to large cutter 314 substantially as shown in Fig. 14.

Threadedly meshed with helical gear 340 is gear 356. Gear 356 is likewise mounted on and keyed to shaft 358. Shaft 358 is similarly mounted for rotation in sides 290 and 292 by means of stationary bushing 360 and waste stripper and shaft support 362. A flash waste stripping portion integrally extends to the exterior of side 292 together with an integral portion of shaft 358. Shaft 358 is suitably coupled with small cutter 316 substantially as illustrated in Fig. 14.

The axes or rotation of large cutter 314 and small cutter 316 are such that the peripheral portion of the exterior face of the small cutter will be adapted to bear against peripheral portions of the interior face of the large cutter. This bearing contact is adjustable by means of movable plate 364. Plate 364 is connected with housing 284 by means of screw 366 and is disposed adjacent the exterior face of side 290. Additionally, a pin 368 may extend from side 290 to be received by bore 370 in plate 364 to render the latter non-rotatable with respect to screw 366. An end portion of plate 364 may present protruding substantially hemispherical surfaces 371 which are adapted to bear against end 372 of shaft 358. By turning screw 366 either clockwise or counter-clockwise, the bearing pressure of hemispherical portion 371 of plate 364 on end 372 of shaft 358 may be accordingly increased or decreased. Consequently, the bearing pressure of the exterior face of small cutter 316 on the interior face of large cutter 314 will be accordingly increased or decreased. A series of guide rolls 373 are provided on the under surface of top 286 of housing 284. These rolls function to guide cutting head 244 and consequently cutter arrangement 248 in proper alignment with the peripheral contours of a sole during a flash cutting operation.

In operation, the double universal 318, large cutter 314 and small cutter 316 will be rotated by motor 322 in the directions indicated by arrows in Fig. 14. The large cutter 314 and the small cutter 316 will rotate at approximately the same surface speeds by the particular arrangement and selection of worm gear 336 and helical gear 340 together with appropriate pitch determinations for the gears within housing 284. The offset relationship between the axis of double universal 318 and shaft 298 coupled with the employment of small offset arm 296 provides for a pivotal movement between cutter head 244 and cutter arm 240. Offset arm 296 coordinates the compound motions of cutter head 244 and cutter arm 240. It will be observed that upon the rotation of double universal 318, the cutter head 244 will rotate in a counter-clockwise direction as viewed in Fig. 6. However, this rotational movement will be arrested upon the contact of stop pin 306 with an end of slot 304. Consequently a torque is created on the cutter head 244 which can be increased or decreased by increasing or decreasing the bearing pressure of the small cutter 316 against the large cutter 314 through adjustable plate 364.

The particular use of anti-friction bearings 300 functions to provide slippage for cutter head 244 and cutter arm 240 when the relative rotation of these two parts is arrested by stop pin 306 abutting against an end of slot 304. It will be apparent that an additional torque on the cutter assembly 124 is created by biased spring 252 which tends to pull cutter arm 240 towards stationary bar 108. This particular rotation of cutter arm 240 is obviously limited by the use of stop 270 and slot 268. Thus, as viewed in Fig. 6, torques are present within the entire cutter assembly 124 which act to pull cutter arm 240 inwardly, while at the same time function to rotate cutter head 244 outwardly. Accordingly, the cutter arrangement 248 will be oriented in such a manner as to have the exterior surfaces of cutters 314 and 316 facing the flashed sole as it is being driven to the first cutting stage by pusher 44. When the cutters 314 and 316 come in contact with the heel portion of the driven flashed sole, cutter arm 240 will move outwardly and the cutters will be forced to bear against the sole by means of the biased spring 252. The desired contours of the heel portion of the driven sole are effectively followed by cutters 314 and 316 due to the torque developed in the cutter head 244 by the rotation of universal 318 which tends to oppose the cutter head rotation induced as a result of bearing pressures developed when a sole is encountered. The torque that is created by the cutters 314 and 316 being in facial contact with one another provides sufficient force to prevent the cutter head from rotating away from the sole as the flashing is being trimmed.

The structure and functioning of cutter assembly 126 is substantially similar to cutter assembly 124. Cutter assembly 126 will function to remove flashes extending from the toe portion of the sole being driven through the first cutting stage. In this connection, cutter arm 242 will be pulled inwardly towards bar 108 by biased spring 254. Cutter head 246 will be swung outwardly by the torques existing therein in order that cutter arrangement 250 will be properly disposed to contact a flashed sole. The torques and the various rotations in cutter assembly 126 will be in an opposite direction to those present in cutter assembly 124, as viewed in Fig. 6.

Lubricator assemblies 380 and 382 are provided for distributing a lubricant to the cutter arrangements 248 and 250 respectively in order that the cutters of each arrangement function to suitably cut the sole flashes and are prevented from wearing excessively. Lubricator assemblies 380 and 382 may include a lubricant container 384 and 386, respectively. The outlets of each container may be suitably regulated by properly disposed valves (not shown). Extending from the outlets of containers 384 and 386 are flexible tubings 388 and 390, which are suitably coupled to the cutter assemblies 124 and 126, respectively.

Figure 17:
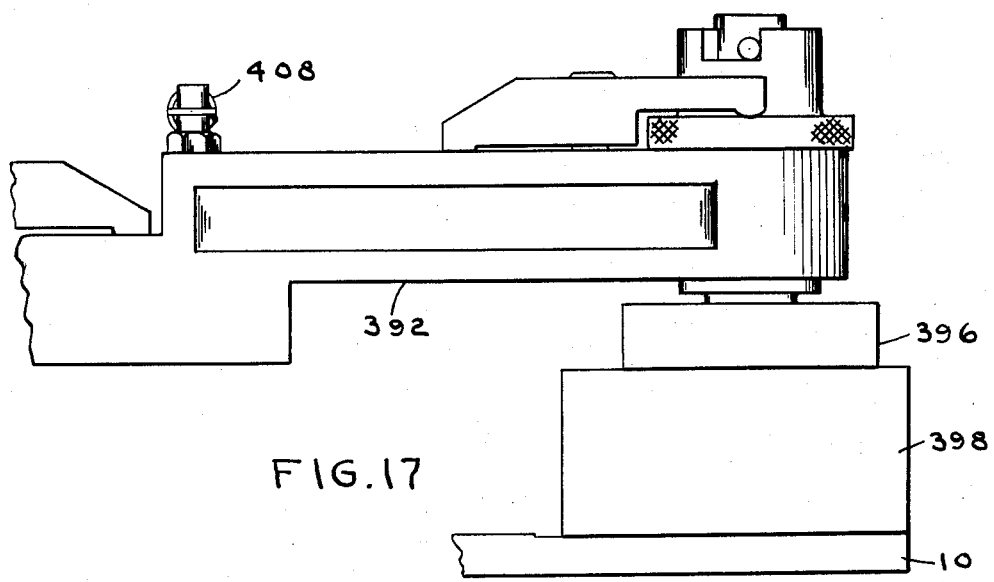
Fig. 17 is a side view of the mounting of the cutter arm on a support for the second cutting stage.

Referring now to the cutter assemblies 172 and 174 in the second cutting stage, with specific reference to Figs. 1, 8 and 17, it will be noted that these cutter assemblies are substantially the same as the cutter assemblies 124 and 126, respectively. However, the adjustments of cutter assemblies 172 and 174 are slightly different in view of the particular sole contours trimmed during this stage. The configuration of cutter arms 392 and 394 is modified in order that they may clear feed roller assembly 176. Accordingly, the cutter arms 392 and 394 are stepped. Cutter arms 392 and 394 are pivotally mounted on elongated plate 396 in a similar manner to the pivotal connection of cutter arms 240 and 242 to plate 106 of the first cutting stage. Elongated plate 396 is securely mounted on bearing plates 398 and 400, which in turn are mounted on top plate 10 of the machine support. A bar 402 is secured to a mount 404 which is affixed to plate 396 as clearly illustrated in Fig. 1. A post 406 extends from upper surfaces of bar 402 to provide means for attaching springs 408 and 410, which provide the desired inward bias of cutter arms 392 and 394 respectively. Cutter heads 412 and 414 are substantially the same as cutter heads 244 and 246, respectively, of the cutter assemblies of the first cutting stage. Similarly, the cutter arrangements 416 and 418 are substantially the same as cutter arrangements 248 and 250 of the cutting assemblies of the first cutting stage.

As aforementioned, the adjustments of cutter assemblies 172 and 174 are slightly different from those of cutter assemblies 124 and 126 of the first cutting stage. In this connection, the adjustments are such that the cutter arrangements 416 and 418 will properly receive terminal portions of the heel of a partially trimmed sole that is being driven through the second cutting stage. Additionally, the torques present within cutter assemblies 172 and 174 are of such a nature that the flashing appearing on the sides of the partially trimmed sole will be suitably removed by the cutter assemblies circumscribing the contours of the sole sides.

The cutters of cutting arrangements 416 and 418 are lubricated by a lubricator assembly mounted on the terminal portion of the free end of bar 402. As viewed in Fig. 8, the usual lubricant container 420 is supported on bar 402 and has a pair of outlet openings that may be suitably regulated by properly positioned valves (not shown). Flexible tubing 422 and 424 extend from these outlets and are properly coupled with cutter assemblies 172 and 174 to supply lubricant to cutter arrangements 416 and 418.

It will be noted in Fig. 9 that the double universals of the cutter assemblies 172 and 174 are driven through a second belt and pulley system 426 by a second motor 428 which is mounted on lower plate 12 of the machine support in substantially the same manner as the universals of the first cutting stage.

Although two cutting stages have been illustrated, as well as a pair of cutting assemblies for each cutting stage, the cutting stages and cutter assemblies may be increased or decreased, depending upon the nature of the flashed article, its shape and contour, the flashing thereon, and the location of the flashing.

It will thus be seen that the objects set forth above among others made apparent from the preceding description are efficiently attained, and since certain changes may be made in the above constructions and techniques without departing from the scope of the invention, it is intended that all matters contained in the above description or shown in the accompanying drawings shall be interpreted as illustrative and not in a limiting sense. Accordingly, the scope of the invention is defined by the appended claims.

I claim:

1. An automatic flash trimming machine for removing flashing from a workpiece comprising in combination: a support; a first cutter means coupled with said support and cooperable to remove portions of flashing from said workpiece; displacement means for passing said workpiece past said first cutter means; a second cutter means coupled with said support and cooperable to remove other portions of said flashing on said workpiece; displacement means coupled with said support for passing said workpiece past said second cutter means; and at least one of said cutter means comprises a pair of arms pivotally mounted on said support, and rotatable cutting elements coupled with the free ends of said arms for removing flashes on said workpiece.

2. The invention in accordance with claim 1 wherein both of said cutter means are sensitive to contours of said workpiece to selectively circumscribe said contours and remove flashes extending therefrom.

3. An automatic flash trimming machine as defined in claim 1, wherein said workpiece is passed between the pair of arms by the displaceable means associated with each of the cutter means having a pair of said arms.

4. An automatic flash trimming machine for removing flashing from a workpiece comprising in combination: a support; a first cutter means coupled with said support and cooperable to remove portions of flashing from said workpiece; first displacement means for passing said workpiece past said first cutter means; a second cutter means coupled with said support and cooperable to remove other portions of said flashing on said workpiece; second displacement means coupled with said support for passing said workpiece past said second cutter means, and said second displacement means being operable to pass said workpiece past said second cutter means upon energization of said second displacement means by said first displacement means upon attainment of a predetermined position by said first displacement means.

5. An automatic flash trimming machine for removing flashing from a workpiece comprising in combination: a support; a first cutter means coupled with said support and cooperable to remove portions of flashing from said workpiece; displacement means for passing said workpiece past said first cutter means; a second cutter means coupled with said support and cooperable to remove other portions of said flashing on said workpiece; displacement means coupled with said support for passing said workpiece past said second cutter means; and at least one of said cutter means comprises at least one cutter head-and-arm assembly which comprises a cutter arm pivotally mounted on said support; and a stop means for limiting the movement of said arm with respect to said support, said cutter arm having biasing means for providing a restoring force which aids to return said arm to a pre-set position after it has been displaced therefrom, a cutter head pivotally mounted on the free end of said arm and being biased with respect thereto, and a stop means for limiting the movement of said head with respect to said arm, and rotatable cutters mounted on said head for removing flashes from the workpiece, and said head being responsive to contours of the workpiece to move relative to said arm and thereby permit said cutters to circumscribe said contours and remove flashes extending therefrom.

6. An automatic flash trimming machine for removing flashing from a workpiece comprising in combination: a support; a first cutter means coupled with said support and cooperable to remove portions of flashing from said workpiece; displacement means for passing said workpiece past said first cutter means; a second cutter means coupled with said support and cooperable to remove other portions of said flashing on said workpiece; displacement means coupled with said support for passing said workpiece past said second cutter means; and at least one of said cutter means comprises at least one cutter head-and-arm assembly, which comprises a cutter arm pivotally mounted on said support, a cutter head pivotally mounted on the free end of said arm, and rotatable cutters mounted on said head for removing flashes on the workpiece.

7. An automatic flash trimming machine for removing flashing from a workpiece comprising in combination: a support; a first cutter means coupled with said support and cooperable to remove portions of flashing from said workpiece; displacement means for passing said workpiece past said first cutter means; a second cutter means coupled with said support and cooperable to remove other portions of said flashing on said workpiece; displacement means coupled with said support for passing said workpiece past said second cutter means; and said second cutter means being spaced from said first cutter means, one of said displacement means being operable along a first linear path, and the other displacement means being operable along a second linear path substantially normal to said first linear path.

8. Cutter mean for trimming a workpiece, said cutter means comprising at least one cutter assembly which comprises in combination: a cutter arm pivotable at one end to a support and adapted to be biased therewith; a cutter head swivelly mounted at the other end of said arm and being biased thereto; and rotatably driven cutter element means on said cutter head for performing a cutting function.

9. Cutter means for trimming a workpiece, said cutter means comprising at least one cutter assembly which comprises in combination: a cutter arm pivotable at one end to a support, stop means cooperable to limit the movement of said arm with respect to said support, and first biasing means cooperable to provide a torque which functions to return said arm to a substantially preset position with respect to said support after it has been displaced therefrom; a cutter head swivelly mounted at the other end of said arm, stop means for limiting the movement of said head with respect to said arm, and second biasing means for biasing said head with respect to said arm to provide a torque which functions to return said head to a preset position with respect to said arm after it has been displaced therefrom; rotatable cutter element means for performing a cutting function; said second biasing means comprises pivotal means for rendering said head rotatable with respect to said first-mentioned arm about a first axis, power driven means having a second axis of rotation spaced from and substantially parallel with said first axis, and a second arm secured to said pivotal means and said power driven means so that when said power driven means rotates about said second axis, said head will rotate with respect to said first arm about said first axis.

10. Cutter means for trimming a workpiece, said cutter means comprising at least one cutter assembly which comprises in combination: a cutter arm pivotable at one end to a support, stop means cooperable to limit the movement of said arm with respect to said support, and first biasing means cooperable to provide a torque which functions to return said arm to a substantially preset position with respect to said support after it has been displaced therefrom; a cutter head swivelly mounted at the other end of said arm, stop means for limiting the movement of said head with respect to said arm, and second biasing means for biasing said head with respect to said arm to provide a torque which functions to return said head to a preset position with respect to said arm after it has been displaced therefrom; rotatable cutter element means for performing a cutting function; said rotatable cutter element means comprises a relatively large cutter and a relatively small cutter, both cutters being rotatable about parallel axes and being in adjustable facial contact with one another; and gear means for rotating said cutters at substantially the same surface speeds.

References Cited in the file of this patent
UNITED STATES PATENTS

| | | |
|---|---|---|
| 137,066 | Gallagher et al. | Mar. 25, 1873 |
| 818,637 | Packard | Apr. 24, 1906 |
| 1,246,566 | Doering | Nov. 13, 1917 |
| 1,292,979 | Winter et al. | Jan. 28, 1919 |
| 1,508,593 | Brothers et al. | Sept. 16, 1924 |
| 1,855,793 | Dorner | Apr. 26, 1932 |
| 1,987,809 | Wernmark | Jan. 15, 1935 |
| 2,297,847 | Wilckens et al. | Oct. 6, 1942 |
| 2,599,267 | Lewin | June 3, 1952 |
| 2,649,909 | Lilley | Aug. 25, 1953 |
| 2,719,991 | Holbroyd et al. | Oct. 11, 1955 |
| 2,722,024 | Burke | Nov. 1, 1955 |